No. 779,280. Patented January 3, 1905.

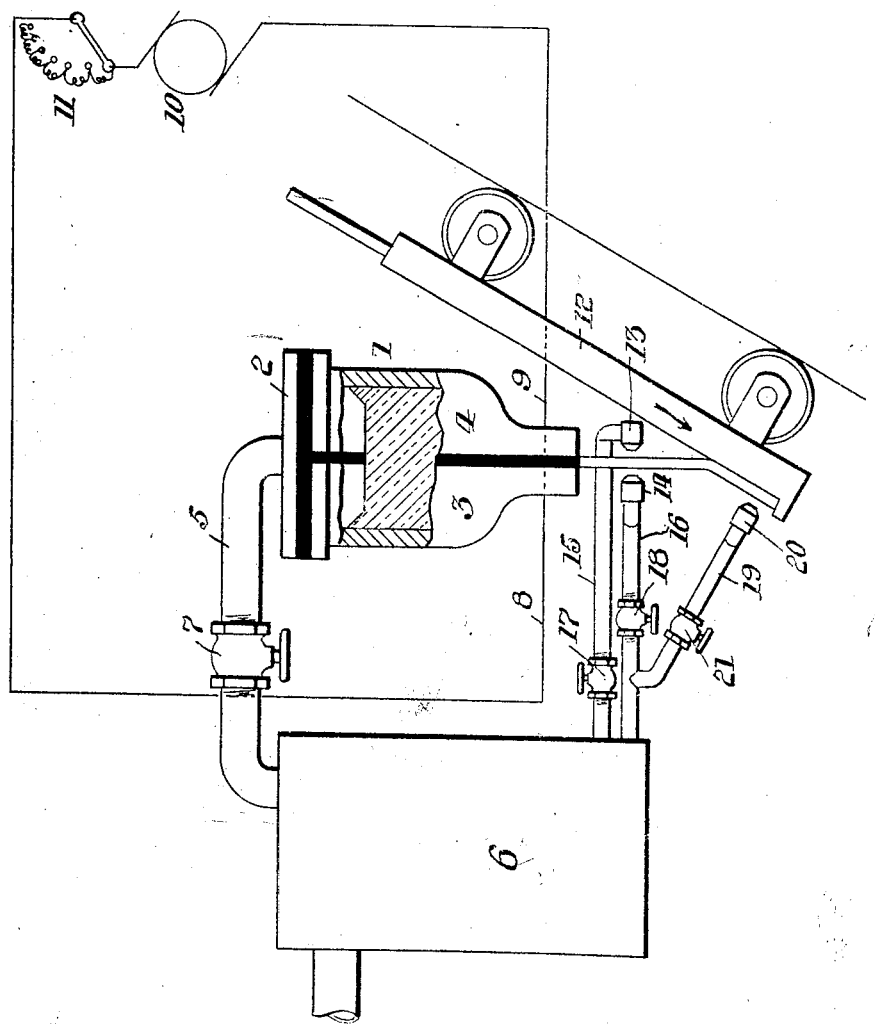

UNITED STATES PATENT OFFICE.

HARRY JACOB HAYS, OF PITTSBURG, PENNSYLVANIA, ASSIGNOR TO EDWARD F. HAYS, TRUSTEE, OF PITTSBURG, PENNSYLVANIA.

PROCESS OF FORMING SHEET-GLASS.

SPECIFICATION forming part of Letters Patent No. 779,280, dated January 3, 1905.

Application filed June 17, 1903. Serial No. 161,783.

*To all whom it may concern:*

Be it known that I, HARRY JACOB HAYS, a citizen of the United States of America, residing at Pittsburg, in the county of Allegheny and State of Pennsylvania, have invented certain new and useful Improvements in Processes of Forming Sheet-Glass, of which the following is a specification, reference being had therein to the accompanying drawing.

This invention relates to certain new and useful improvements in a process for forming sheet-glass, and relates more particularly to a process whereby the molten glass is forced through a narrow slot for the purpose of forming the same to a given gage.

The object of this invention is to provide a process whereby sheet-glass may be cheaply and effectually formed and at the same time to carry out the process in such a manner that the glass may be of uniform surface and without blemish.

In describing the invention in detail reference will be had to the accompanying drawing, showing one form of apparatus by means of which my improved process may be carried into effect.

The drawing shows a diagrammatical side elevation of an apparatus, partially in section, showing the sheet of glass being formed.

To carry out my improved process, the glass batch is first heated to such a state as to make the glass very pliable and is then placed in a pot 1. This pot is formed in two sections 3 4, heavily insulated from each other, and a cover 2, heavily insulated from the sections 3 4. The lower portions of the sections are contracted, so that the glass in passing through the outlet at the lower end of the pot will be gaged to the desired thickness. The glass is forced out of the pot under pressure, which may be accomplished by a plunger operating through the cover of the pot, but generally and preferably accomplished by air-pressure, the air being led through the cover into the top of the pot through a suitable pipe 5, connected to any suitable source of air-supply, as 6, a valve 7 being interposed in the pipe 5 for controlling the amount of air admitted to the pot.

The glass in passing through the outlet of the pot is electrically maintained at any desired heat, which I accomplish by providing a suitable source of electrical energy 10 and connecting the two poles 8 9 of an electrical circuit to the sections 3 4, respectively, of the pot, interposing in the electrical circuit a variable resistance 11. It will thus be seen that the glass in passing through the outlet may be kept at any desired heat, due to the resistance of said glass through which the electrical current must pass in order to complete the circuit.

It is a well-known fact that glass when heated to a certain degree will act as a conductor, and in the present instance I find that in order to prevent the glass from varying in temperature to any great extent it is often necessary to increase or decrease the voltage, and to accomplish this I provide the variable resistance 11 in the circuit.

The sheet of glass formed by forcing the glass from the pot is received on a platform or table, generally in the form of a car 12. In order that the glass when coming from the pot will not be marked or disfigured by engagement with the table, the sheet is partially cooled by an air-blast projected onto opposite sides of the glass sheet through nozzles 13 14, carried by pipes 15 16, respectively, and which pipes are connected to the source 6 of air-supply, said pipes having suitable valves 17 18, respectively, interposed therein for the purpose of controlling the amount of air conducted to the nozzles.

In order that the glass in passing from the pot to the platform will not have to be given any undue bend, it is preferable to have the platform at an angle, as shown, and for finally flattening and cooling the sheet of glass on the table or platform I project a blast of air against the sheet by connecting a pipe 19 with pipe 16, providing said pipe with a suitable nozzle 20 and controlling-valve 21. When a sheet of glass nearly the length of the table or platform has been formed, the glass is severed, and the plane upon which the car is then caused to travel will be such that further movement thereof will bring it into position to permit the introduction of the glass into a leer.

In the process herein described for forcing the glass out of the pot it has been found that by introducing the air into the pot on top of the glass, as described, the glass is forced out evenly and without any undue chilling of the same.

It will be evident, of course, that in practicing the process various changes may be made in the form or arrangement of the apparatus without departing from the general spirit of the invention.

Having fully described my invention, what I claim as new, and desire to secure by Letters Patent, is—

1. The herein-described process of forming sheet-glass consisting in first electrically maintaining the glass in a molten state, then forming the glass to a predetermined gage under air-pressure and partially cooling the same by currents of air blown against its opposing sides, and finally in receiving one side of said glass on a support and subjecting the opposite side thereof to a current of air to flatten and cool the same.

2. The herein-described process of forming sheet-glass consisting in electrically maintaining a pliable batch of glass in its pliable condition, employing a source of air-pressure to eject said glass to form the same into sheets of a predetermined gage, employing air to partially cool the glass by contact with its opposing sides, passing the glass to a support, and flattening the glass by a blast of air projected against the glass while on the support.

In testimony whereof I affix my signature in the presence of two witnesses.

HARRY JACOB HAYS.

Witnesses:
 GEO. B. ROWLEY,
 GEORGE M. SCHMIDT.